(12) United States Patent
Ooi

(10) Patent No.: US 8,179,956 B2
(45) Date of Patent: May 15, 2012

(54) ADAPTIVE EQUALIZER AND ADAPTIVE EQUALIZATION METHOD

(75) Inventor: Yasushi Ooi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 621 days.

(21) Appl. No.: 12/318,642

(22) Filed: Jan. 5, 2009

(65) Prior Publication Data

US 2009/0190646 A1 Jul. 30, 2009

(30) Foreign Application Priority Data

Jan. 28, 2008 (JP) .................................. 2008-16573

(51) Int. Cl.
*H03H 7/40* (2006.01)
*G06F 17/10* (2006.01)

(52) U.S. Cl. ....................................... 375/232; 708/322

(58) Field of Classification Search .................. 375/232, 375/229, 350; 708/322, 323
See application file for complete search history.

(56) References Cited

U.S. PATENT DOCUMENTS

| 2004/0114912 A1* | 6/2004 | Okamoto et al. ............. 386/114 |
| 2005/0123035 A1 | 6/2005 | Yamamoto et al. |
| 2007/0188218 A1* | 8/2007 | Ueda ............................. 327/551 |
| 2008/0013617 A1 | 1/2008 | Ooi |
| 2009/0122931 A1 | 5/2009 | Hoshuyama |

FOREIGN PATENT DOCUMENTS

| EP | 1 865 607 A1 | 12/2007 |
| JP | 63-248218 A | 10/1988 |
| JP | 2005-167717 A | 6/2005 |
| JP | 2006-287654 A | 10/2006 |
| JP | 2007-318349 A | 12/2007 |
| JP | 2008-22422 A | 1/2008 |
| WO | WO 2007/001889 A2 | 1/2007 |
| WO | WO 2007/010849 A1 | 1/2007 |

* cited by examiner

*Primary Examiner* — Khai Tran

(74) *Attorney, Agent, or Firm* — Foley & Lardner LLP

(57) ABSTRACT

An adaptive equalizer includes an adaptive filter and a control unit. The adaptive filter performs an adaptive equalization processing for an input signal so as to make an amplitude of an equalized output signal constant, the input signal being modulated by a modulation system that produces a modulation signal with constant amplitude characteristics. The control unit gradually changes equalization ability of the adaptive equalization processing of the adaptive filter in accordance with characteristics of the input signal.

26 Claims, 10 Drawing Sheets

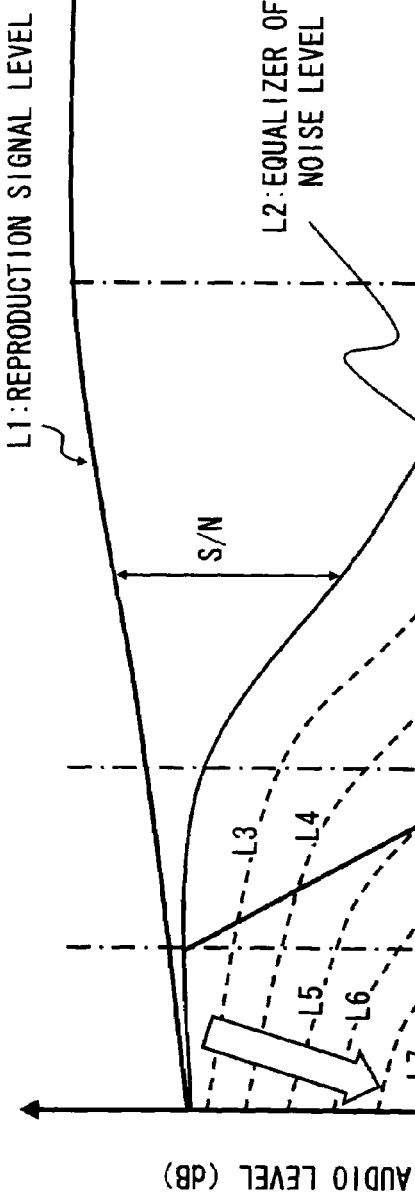
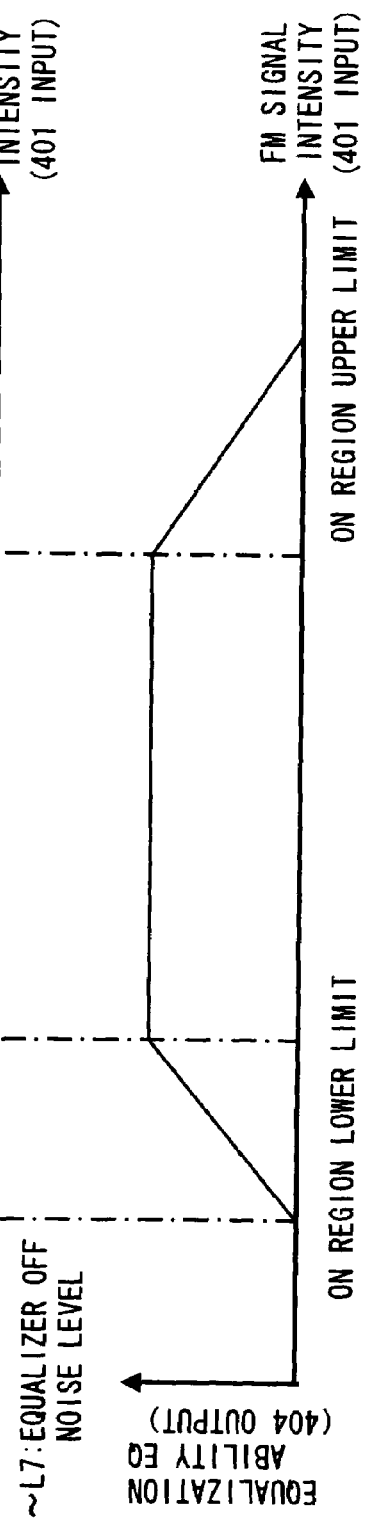
Fig. 10A
Fig. 10B

ADAPTIVE EQUALIZER AND ADAPTIVE EQUALIZATION METHOD

BACKGROUND

1. Field of the Invention

The present invention relates to a technique of adaptive equalizing of radio signals such as a frequency modulation signal (hereinafter referred to as FM signal), and more specifically, to an adaptive equalizer with a function of activating and stopping an adaptive equalization processing.

2. Description of Related Art

In a radio broadcasting system such as an FM radio or a wireless communication system, a transmission signal is deteriorated due to multipath distortion or noises in a wireless transmission path. To that end, an equalizer for recovering the received transmission signal that is deteriorated after propagating through the wireless transmission path is used on the wireless receiver side. In general, a state of the wireless transmission path is uncertain on the receiver side. Further, a wireless receiver with high mobility should follow change in characteristics of the wireless transmission path. Thus, an adaptive equalizer capable of following the change in characteristics of the wireless transmission path has been used.

In general, the adaptive equalizer is configured by a digital filter (hereinafter referred to as adaptive filter) such as an IIR (Infinite Impulse Response) filter and an FIR (Finite Impulse Response) filter, and an adaptation algorithm such as an LMS (Least Mean Square) algorithm and an NLMS (Normalized LMS) algorithm has been employed to optimize filter coefficients.

To optimize the filter coefficients based on the adaptation algorithm, a reference signal for estimating characteristics of the wireless transmission path is necessary. As one conceivable method, a training signal with a known signal pattern is sent earlier than an information signal and used as a reference signal to determine filter characteristics. As another method, a blind equalization method has been well known. The blind equalization method generates a reference signal from a received signal and thus does not need to previously send a training signal. Examples of the blind equalization method include a CMA (Constant Modulus Algorithm).

The CMA is an algorithm in general, which sets a statistical quantity regarding the filter output signal such as an envelope of a filter output signal and higher-order statistical quantity thereof as an index, and updates the filter coefficients to approximate the index to a target value. The CMA is effective for a modulation system where a modulation signal has constant amplitude characteristics such as an FM (Frequency modulation) signal or PM (Phase modulation) signal.

INOUE (Japanese Unexamined Patent Application Publication No. 2006-287654) discloses an adaptive equalizer having a CMA blind adaptive equalization function. The adaptive equalizer disclosed in INOUE determines whether a condition that a received signal is deteriorated by an update of filter coefficients of an adaptive filter is fulfilled or not, and suppresses the operation of the adaptive filter if this condition is fulfilled. According to the technique of INOUE, the received signal is deteriorated based on the determination whether the overmodulation is produced or not, whether a field strength is the weak electrical field or not, whether a sudden change in electrical field is produced, and whether the switching is based on the diversity reception operation.

Further, INOUE discloses two specific methods for suppressing the operation of the adaptive filter. The first method is to stop updating the filter coefficients of the adaptive filter. According to this first method, the filter coefficient of the adaptive filter is fixed to a value just before the coefficient update has been prohibited. Accordingly, the adaptive filter continues the fixed equalization processing while keeping the state before the operation is suppressed. The second method is to directly supply the received signal to the detector by bypassing the adaptive filter. According to the second method, the equalization processing is not carried out at all.

The adaptive equalization based on the CMA can adaptively configure a filter having characteristics opposite to characteristics of a wireless transmission path unless a factor of signal deterioration such as multipath distortion in a wireless transmission path, an interfering wave, and noise hinders estimation of a modulation signal with constant amplitude from a received signal. However, if there is a factor of signal deterioration that hinders estimation of a modulation signal with constant amplitude from a received signal, adaptive equalization processing is no longer performed stably through the CMA.

For example, when input signal intensity is greatly changed at a small interval, it is impossible to make the correction error to converge even when the CMA approximates the correction error to 0, which may lead to unstable operations such as oscillations in the filter coefficients.

Accordingly, when there is such a factor of signal deterioration, it is preferable to control the equalization ability of the adaptive filter so that the operational stability of the adaptive filter is fully secured.

The above-described adaptive equalizer disclosed by INOUE only operates the adaptive filter as a fixed equalization filter or carries out the detection processing by bypassing the adaptive filter without carrying out the equalization processing after determining whether the condition that the received signal is deteriorated by the update of the filter coefficients is fulfilled or not. Accordingly, the adaptive equalization processing is not carried out at all after the determination of the satisfaction of the condition. In summary, the equalization ability control of the adaptive filter executed by the adaptive equalizer of INOUE alternatively selects one of the state in which the adaptive equalization is carried out and the state in which the adaptive equalization is not carried out at all (state in which the fixed equalization is performed or state in which the equalization processing is not performed) based on the satisfaction of the condition that the received signal is deteriorated.

SUMMARY

The present inventors have found a problem as follows in the control method of alternatively selecting the execution and the non-execution of the adaptive equalization disclosed in INOUE. That is, when the state in which the adaptive equalization is executed is immediately switched to the state in which the equalization processing is not executed at all by bypassing the adaptive filter in accordance with the satisfaction of the condition that the received signal is deteriorated, the difference in the reception state before and after the switch becomes so large that it may lead to the difference of audibility, especially when receiving the radio broadcasting. Further, the control of immediately bypassing or returning the adaptive filter generates discontinuity of the signal, which is detected as the noise and deteriorates the auditory state.

Further, when the adapting processing is stopped and the fixed equalization is continued while holding in the adaptive filter the filter coefficient immediately before the stop in accordance with the satisfaction of the condition that the received signal is deteriorated, the reception is continued while maintaining the inverse characteristics of the wireless transmission path which is estimated in the signal deterioration state. Accordingly, undesired reception characteristics may be continued. Further, when the adapting processing is restarted, the adaptive equalization is started under a new reception condition with undesired filter characteristics as an initial value, which may lead to undesired operation which depends on the initial value.

A first exemplary aspect of an embodiment of the present invention is an adaptive equalizer including an adaptive filter and a control unit. The adaptive filter performs an adaptive equalization processing for an input signal so as to make an amplitude of an equalized output signal constant, the input signal being modulated by a modulation system that produces a modulation signal with constant amplitude characteristics. The control unit gradually changes equalization ability of the adaptive equalization processing of the adaptive filter in accordance with characteristics of the input signal.

According to the above configuration, when the input signal which may cause the deterioration of the quality by the adaptive equalization is input, instead of immediately stopping the adaptive processing, the equalization ability of the adaptive filter can be changed by degrees to be made gradually smaller as the input signal becomes a state of not being suitable to the adaptive equalization processing, for example. Accordingly, it is possible to avoid the occurrence of the demodulation noise which is generated by discontinuous variations of the signal along with the operation of immediately stopping the adaptive equalization while suppressing the generation of the unstable signal due to non-convergence, oscillation, and divergence of the filter coefficients of the adaptive filter.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 10A is a graph showing a relation between a reproduction signal level and a noise level in a stereo demodulation unit 110 and an input FM signal intensity supplied to an FM signal intensity input 401;

FIG. 10B is a graph showing the change of the equalization ability of the equalizer in accordance with FIG. 10A;

DETAILED DESCRIPTION OF THE EXEMPLARY EMBODIMENTS

Figure 1:
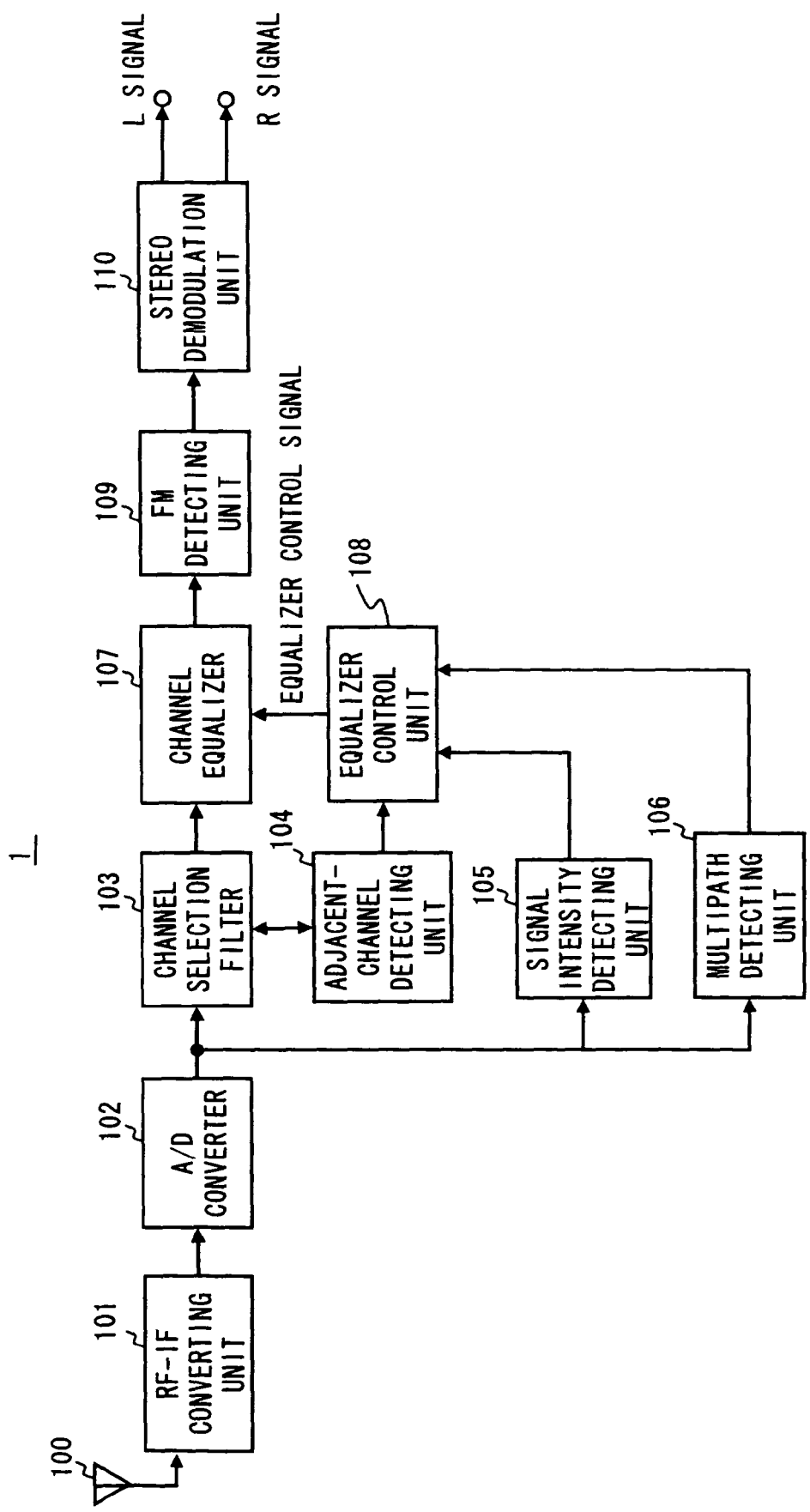
FIG. 1 is a block diagram showing the configuration of an FM receiver according to a first exemplary embodiment of the present invention.

Detailed description is given of the specific exemplary embodiments of the present invention below with reference to the accompanying drawings. The same components are denoted by identical reference numerals throughout the drawings, and the overlapping description will be omitted as appropriate for the sake of clarity.

<First Exemplary Embodiment>

FIG. 1 shows the configuration of an FM receiver 1 according to the first exemplary embodiment. Referring first to FIG. 1, components of the FM receiver 1 are described. In FIG. 1, an RF-IF converting unit 101 receives an RF signal through an antenna 100, and combines the input RF signal and a signal generated with a local oscillator (not shown) to generate an IF signal.

The IF signal generated with the RF-IF converting unit 101 is converted into a digital signal by an A/D converter 102 and input to a channel selection filter 103. The channel selection filter 103 is a band pass filter to extract a desired channel from the input signal.

The IF signal subjected to bandwidth selection with the channel selection filter 103 (hereinafter referred to as "input FM signal") is input to a channel equalizer 107. The channel equalizer 107 is an adaptive equalizer to compensate for signal distortion of an input FM signal due to multipath delay wave, interfering wave, and noise. The equalizer 107 performs adaptive equalization processing for the purpose of stabilizing amplitude of an output signal. The channel equalizer 107 is configured by, for example, an FIR filter to optimize filter coefficients based on an LMS algorithm. Incidentally, a specific configuration example of the channel equalizer 107 is described later in detail.

The input FM signal equalized by the channel equalizer 107 (hereinafter referred to as "equalized FM signal") is input to an FM detecting unit 109. The unit 109 performs FM detection, that is, demodulates a modulated sound signal through frequency-amplitude conversion. A stereo demodulation unit 110 demodulates the modulated sound signal to stereo sound signals (L signal and R signal) and outputs the stereo sound signals.

An adjacent-channel detecting unit 104 estimates an amount of the adjacent-channel signal which is mixed into the input FM signal. The transmission bandwidth of the channel selection filter 103 is selected according to the detection result in the adjacent-channel detecting unit. In order to estimate the amount of the adjacent-channel signal, for example, the adjacent-channel detecting unit 104 extracts an adjacent-channel band through a band pass filter, and detects the extracted signal intensity by time mean of full-wave rectification result. When the signal intensity of an adjacent channel exceeds a predetermined threshold value, it is likely that the adjacent-channel signal is included in the input FM signal subjected to bandwidth selection with the channel selection filter 103. Note that this detection method is merely one example, and the method of detecting the amount of the adjacent channel in the first exemplary embodiment of the present invention is not specifically limited.

A signal intensity detecting unit 105 detects signal intensity of the input FM signal. The unit 105 calculates, for example, the time mean of the full-wave rectification result of the input FM signal.

A multipath detecting unit 106 detects signal intensity of a multipath signal included in the input FM signal. In order to detect the signal intensity of the multipath signal, the unit 106 extracts multipath component through the band pass filter, and detects signal intensity by the time mean of the full-wave rectification result, for example.

The FM receiver 1 according to the first exemplary embodiment uses at least above-described characteristics of the signal input to the FM receiver 1, which are interference amount of the adjacent-channel signal, the signal intensity of the input FM signal, and the signal intensity of the multipath signal for an equalization ability control in an equalizer control unit 108 that will be described later.

The equalizer control unit 108 gradually changes the equalization ability of the channel equalizer 107 depending on the interference amount of the adjacent-channel signal, the signal intensity of the input FM signal, and the signal intensity of the multipath signal. More specifically, the unit 108 outputs an equalizer control signal for gradually decreasing the equalization ability of the adapting processing when it is determined that the channel equalizer 107 does not stably approximate the filter coefficients based on the interference amount of the adjacent-channel signal, the signal intensity of the input FM signal, and the signal intensity of the multipath signal. The specific example of the equalization ability control by the equalizer control unit 108 will be described later in detail.

Controlled by the equalizer control unit 108, the channel equalizer 107 adjusts the equalization ability in the adapting processing in multi stages by making the internal filter coefficients converge to the specific values and adjusting the convergence speed, changing the magnification of the coefficient updating (step size), or changing a number of taps of the equalizer, for example.

For example, when the filter coefficients of the adaptive filter included in the channel equalizer 107 converge to the specific values, one of the filter coefficients is made converge to the value 1, and the other filter coefficients to the value 0, whereby the channel equalizer gives a delay to the input FM signal and outputs the delayed input FM signal without modification. In short, the channel equalizer 107 does not function as the equalizer. The equalization ability can be adjusted gradually by controlling the convergence speed (time constant) of the filter coefficients.

Even when one of the filter coefficients is made converge to a value whose absolute value is 1 instead of making it converge to the value 1, the same object can be realized. This is also applied to a case in which the channel equalizer 107 has a complex equalizer. Further, the convergence value may be a value other than 0 considering that the FM detection does not depend on amplitude. Further, a plurality of filter coefficients may converge if there are small number of filter coefficients whose convergence value is other than 0. However, in the first exemplary embodiment, the description will be made on a case where one filter coefficient converges to 1 for the sake of clarity.

In case of changing the magnification of updating the filter coefficients (step size) of the adaptive filter, by reducing the step size, the adaptive equalization cannot follow the change of the real signal and the filter coefficients hardly change. Thus, the equalization ability can be adjusted gradually by controlling the speed of updating the filter coefficients as well.

Further, in case of changing the number of taps of the adaptive filter, by reducing the number of taps, the order of the filter formed by the adaptive filter is limited and the strong equalization cannot be performed. Thus, the equalization ability can be adjusted gradually by controlling the number of taps as well.

The control of the equalization ability of the channel equalizer 107 by the equalizer control unit 108 is performed in accordance with the input conditions: the interference amount of the adjacent-channel signal; the signal intensity of the input FM signal; and the signal intensity of the multipath signal. More specifically, the equalization ability is changed in accordance with quantitative change of the interference amount of the adjacent-channel signal, the signal intensity of the input FM signal, and the signal intensity of the multipath signal.

The gradual control of the equalization ability of the adaptive filter included in the channel equalizer 107 is performed as above to avoid large discontinuous variations of the signal output from the channel equalizer 107. As such, it is possible to avoid the occurrence of the demodulation noise that is undesired for a human auditory sense due to the abrupt change of the signal.

Incidentally, when each input condition which is described above is not exclusive, in other words, when each input condition is satisfied at the same time, the equalizer control unit 108 is performed so that the equalization ability is not redundantly controlled based on each input condition in order to prevent malfunction of the channel equalizer 107. More specifically, the input conditions are prioritized in advance. Then, when the input condition with higher-priority is satisfied, the control based on the other input conditions with relatively lower priority is not performed.

Further, when the equalizer control unit 108 reflects the quantitative change of the input condition in the level of the equalization ability, it is preferable to increase or decrease the equalization ability with the response delay instead of immediately increasing or decreasing the equalization ability in time series. In other words, the control of increasing or decreasing the equalization ability is preferably performed with time constant with respect to the change of the input condition. Further, the time constant of the response delay in increasing the equalization ability and the time constant of the response delay in decreasing the equalization ability may be different and asymmetric values.

Figure 2:
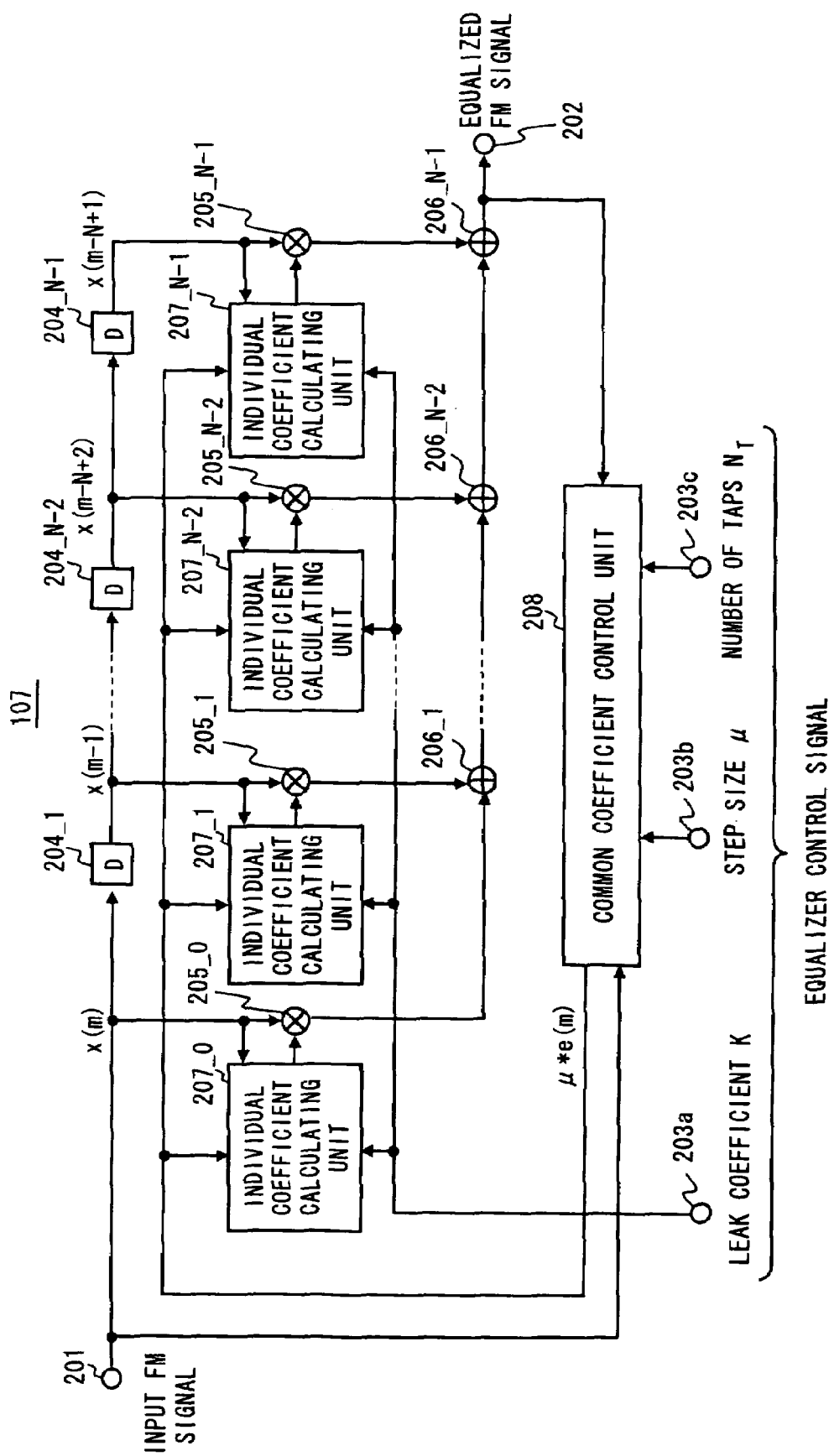
FIG. 2 is a block diagram of a channel equalizer provided in the FM receiver according to the first exemplary embodiment of the present invention.

In the following description, a configuration example of the channel equalizer 107 and the equalizer control unit 108 will be described in this order. FIG. 2 shows a detailed block diagram of the channel equalizer 107 in FIG. 1. In the configuration example shown in FIG. 2, the channel equalizer 107 includes an FIR (Finite Impulse Response) type digital filter configuration receiving an input FM signal input 201 and outputting an equalized FM signal output 202. Further, the channel equalizer 107 shown in FIG. 2 updates the filter coefficients of the FIR filter by the LMS algorithm.

N−1 delay devices 204_1 to 204_N−1 each gives a delay of predetermined periods to the input FM signal and outputs the delayed signals. In other words, the delay devices 204_1 to 204_N−1 constitute the input delay of the FIR filter.

N multipliers 205_0 to 205_N−1 multiply signals x(m) to x(m−N+1) at N tap points between the FM signal input 201 and the delay devices 204_1 to 204_N−1 by filter coefficients C (m, 0) to C (m, N−1), respectively. The N values obtained through the multiplication by the filter coefficients are added by N−1 adders 206_1 to 206_N−1 and output to the equalized FM signal output 202. That is, the N multipliers 205_0 to 205_N−1, and the N−1 adders 206_1 to 206_N−1 perform convolutional operation of the input FM signals x(m) to x(m−N+1) and the filter coefficients C (m, 0) to C (m, N−1).

N individual coefficient calculating units 207_0 to 207_N−1 calculate filter coefficients C (m, 0) to C (m, N−1). To be specific, the units 207_0 to 207_N−1 each calculates a new filter coefficient based on an update value input from a common coefficient control unit 208, a filter coefficient before one sampling period and a sampling value of the input FM signal before one sampling period.

The common coefficient control unit 208 calculates the update value of the filter coefficient based on the LMS algorithm and supplies the calculated value to the individual coefficient calculating units 207_0 to 207_N−1. The LMS algorithm executed by the individual coefficient calculating units 207_0 to 207_N−1 and the common coefficient control unit 208 is expressed by Expression (1).

$$\vec{h}(m+1) = \vec{h}(m) + \mu e(m)\vec{u}(m) \qquad (1)$$

In Expression (1), a vector h(m) is a vector including N filter coefficients C(m, 0) to C(m, N−1) at an m-th sample and is described from Expression (2). Further, the vector u(m) is an input signal vector representing tapped input FM signals x(m) to x(m−N+1) and is derived from Expression (3). Further, μ represents a scalar value called a "step size". Further, e(m) represents an error amount of a filter coefficient expressed by Expression (4).

$$\vec{h}(m) = \begin{pmatrix} C(m, 0) \\ C(m, 1) \\ \vdots \\ C(m, N-1) \end{pmatrix} \qquad (2)$$

$$\vec{u}(m) = \begin{pmatrix} x(m) \\ x(m-1) \\ \vdots \\ x(m-N+1) \end{pmatrix} \qquad (3)$$

$$e(m) = d(m) - V(m) \qquad (4)$$

In Expression (4), d(m) represents a reference signal. In this exemplary embodiment, a target value of an envelope amplitude calculated based on an input FM signal is a reference signal d(m) by the utilization of the fact that the FM signal has a constant amplitude. The common coefficient control unit 208 calculates the reference signal d(m) based on the input FM signal, and calculates an error amount e(m) based on a difference between the reference signal d(m) and an envelope amplitude V(m) derived from the filter output value. Moreover, the common coefficient control unit 208 outputs a value calculated by multiplying the error amount e(m) by a predetermined step size μ to the individual coefficient calculating units 207_0 to 207_N−1.

Incidentally, the calculation system in the adaptive filter includes a real number calculation and a complex number calculation. When the channel equalizer 107 shown in FIG. 2 is the adaptive filter of the complex number calculation system, the FM signal input 201 is converted into the complex form by Hilbert transform or the like in advance, and then the filtering processing is executed using the complex number. The advantage of using the complex form is that the amplitude of the input FM signal can be immediately calculated as the absolute value of the complex number in all the sampling points. On the other hand, when the real number form is employed, the time mean system such as the envelope detection or the full-wave rectification needs to be employed to obtain the amplitude of the input FM signal. However, the generality is not lost even with the real number or the complex number in this exemplary embodiment.

The configuration example of the individual coefficient calculating units 207_0 to 207_N−1 for changing the equalization ability of the channel equalizer 107 according to the equalizer control signal will be described next. In this example, explanation will be made on a case in which one of the N filter coefficients C(m, 0) to C(m, N−1) is made to converge to "1" and the other N−1 filter coefficients are made to converge to "0". Note that the individual coefficient calculating unit making the factor converge to "1" may be any one of the N filter coefficients. The following description is directed to a case where the filter coefficient C(m,0) calculated by the unit 207_0 is made to converge to "1" and the filter coefficients calculated by the other units 207_1 to 207_N−1 are made to converge to "0" by way of example.

Figure 3:
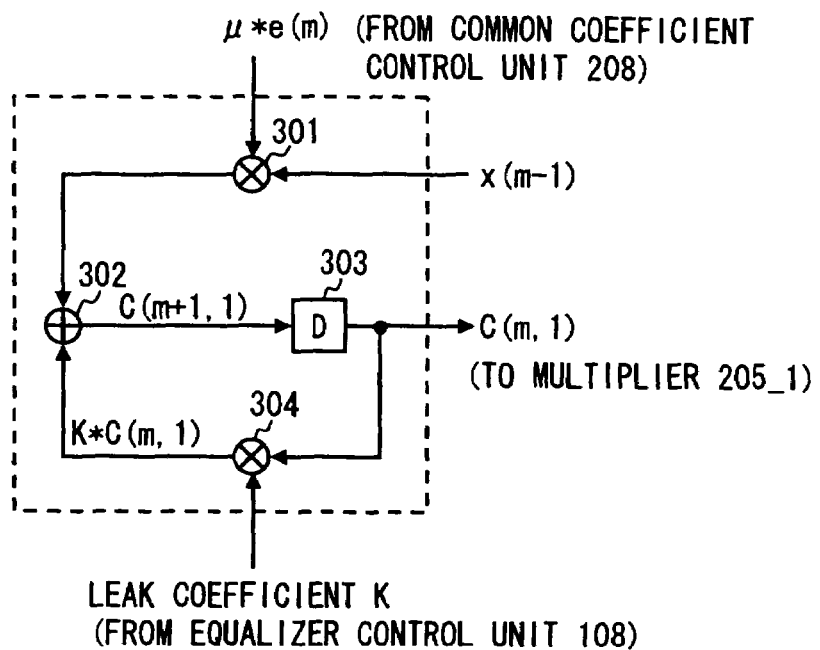
FIGS. 3 to 6 show configuration examples of an individual coefficient calculating unit provided in the channel equalizer.

FIG. 3 is a configuration example of the individual coefficient calculating unit 207_1 that approximates a filter coefficient to "0" at the time of stopping the adaptive equalization processing. The multiplier 301 multiplies a scalar value μe(m) input from the common coefficient control unit 208 by a sampling value x(m−1) of the input signal. The multiplier 304 multiplies a filter coefficient given a delay of one sampling period with the delay device 303 by the equalizer control signal K. The adder 302 adds an output value from the multiplier 301 and an output value from the multiplier 304, and outputs an update value C(m+1, 1) of the filter coefficient. That is, the update value C(m+1, 1) of the filter coefficient output from the adder 302 is derived from Expression (5).

$$C(m+1,1) = KC(m,1) + \mu e(m)x(m-1) \qquad (5)$$

When the normal adaptive equalization processing is carried out with maximum equalization ability, the value of the leak coefficient K supplied to the equalizer control signal input 203a from the equalizer control unit 108 is set to 1. Expression (5) in this case shows an updated algorithm similar to Expression (1) above.

On the other hand, when the equalization ability of the adapting processing is changed gradually, the value of the leak coefficient K supplied to the equalizer control signal input 203a is set larger than 0 and smaller than 1 (0<K<1). Accordingly, the coefficient data held in the delay device 303 is updated to the value obtained by multiplying the current coefficient data by the leak coefficient K (0<K<1) and is used in the next sampling period. This condition is kept during a state where the equalization ability of the adapting processing is controlled.

Assume that the output signal value of the common coefficient control unit 208 is fixed to 0. As 0<K<1, the coefficient data forms a geometrical progression along with the sampling period and is made to converge to 0. In order to set the output signal value of the common coefficient control unit 208 to 0, the step size u is set to 0, for example. When the value of the leak coefficient K is enough close to 0, the filter coefficients may be made to converge to 0 regardless of the value of the output signal of the common coefficient control unit 208. On the other hand, when the value of K is rather close to 1, the coefficient data does not necessarily converge to 0, and the equalizer continuously operates with weak equalization ability. Further, the convergence speed when the filter coefficient converges to 0 becomes faster as the leak coefficient K is smaller.

Figure 4:
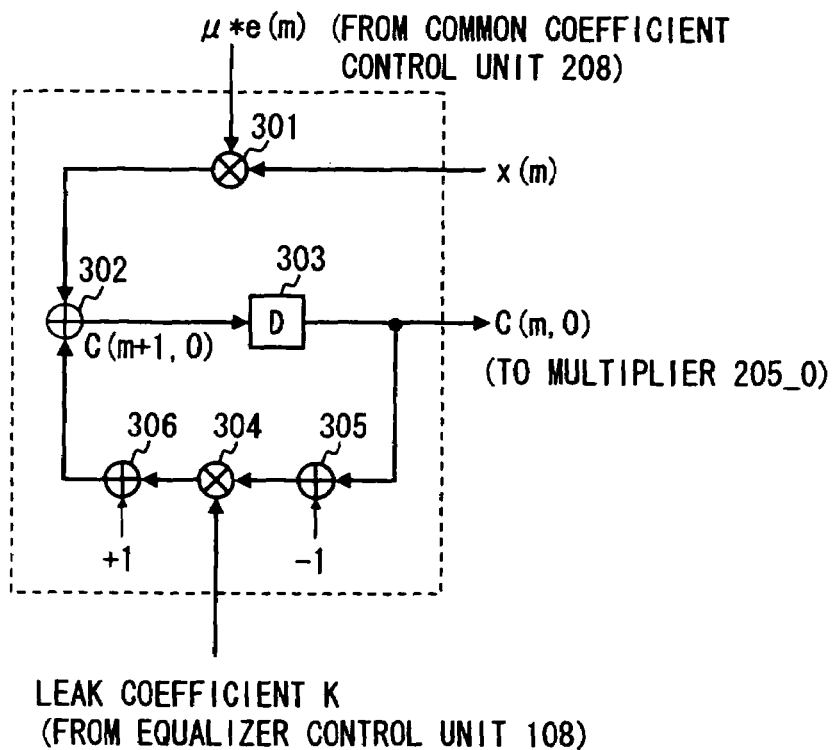

FIG. 4 shows a configuration example of the individual coefficient calculating unit 207_0 that makes the filter coefficient converge to "1" at the time of stopping the adaptive equalization processing. The individual coefficient calculating unit 207_0 shown in FIG. 4 differs from the individual coefficient calculating unit 207_1 shown in FIG. 3 in that a −1 adder 305 and a +1 adder 306 are provided upstream of and downstream of the multiplier 304. In this case, an update value C(m+1, 0) of the filter coefficient output from the adder 302 is expressed by Expression (6). That is, at the time of stopping the adaptive equalization processing, if the leak coefficient K is larger than 0 and smaller than 1 (0<K<1), and the step size μ is 0, the filter coefficient gradually approximates to 1 upon each update, and finally converges to 1.

$$C(m+1, 0)=K\{C(m, 0)-1\}+\mu e(m)x(m)+1 \quad (6)$$

According to the configurations shown in FIGS. 3 and 4, the filter coefficients can gradually converge to a target value at the time of stopping the adaptive equalization processing of the channel equalizer 107, instead of instantly changing the filter coefficients to the target value 1 or 0. Accordingly, large discontinuous variations of an output signal from the channel equalizer 107 can be suppressed, making it possible to prevent noise generated in a stereo sound signal due to discontinuous variations.

When the channel equalizer 107 is the adaptive filter of complex form, a complex arithmetic unit is used as each operation unit of FIGS. 3 and 4. In case of convergence to 0 in FIG. 3, both of a real part and an imaginary part of the filter coefficient are made to converge to 0. In case of convergence to 1 in FIG. 4, the real part of the filter coefficient is made to converge to 1, and the imaginary part thereof is made to converge to 0.

Figure 5:
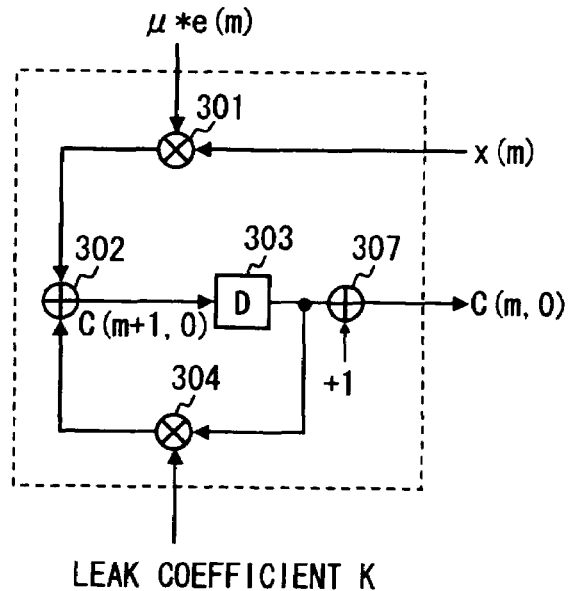

FIG. 5 illustrates another example of the configuration of the individual coefficient calculating unit 207_0 that makes the filter coefficient converge to the value of "1" at the time of stopping the adaptive equalization processing. In FIG. 5, a fixed value 1 is added to the filter coefficient by the adder 307, and the other configuration is the same as that of FIG. 3. According to the configuration, the temporal standard of the FIR filter output with respect to the input is determined by the position of the coefficients, and the generality of the adaptive filter operation is not lost.

Figure 6:
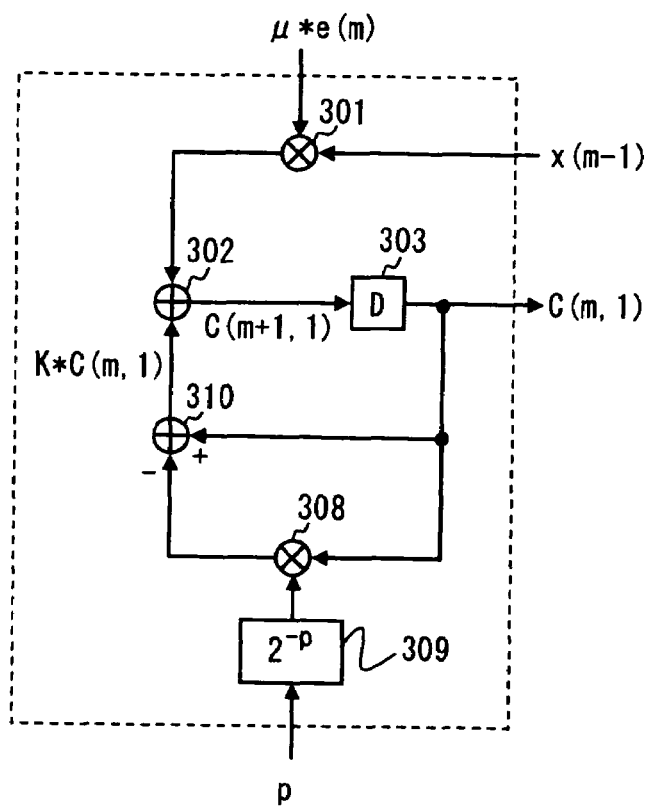

FIG. 6 illustrates another example of the configuration of the individual coefficient calculating unit 207_1 that makes the filter coefficient converge to the value of "0" at the time of stopping the adaptive equalization processing. The configuration of FIG. 6 corresponds to the case in which the value of the leak coefficient K is set to $1-2^{-p}$ of the configuration shown in FIG. 3. A case of p=0 corresponds to K=0, and a case where p is a positive integer of 1 or more corresponds to 0<K<1. In case of the configuration shown in FIG. 6, the number of multiplications is not increased compared with the configuration of FIG. 3. The configuration of FIG. 6 is specifically effective when the adaptive filter is realized by fixed-point arithmetic.

The multiplier 308 multiplies the filter coefficient C(m, 1) before one sampling period by a value $2^{-p}$ calculated in the arithmetic unit 309. Note that "p" represents an integer that is larger than 0. Such multiplication can be realized through signed p-bit shift operation. The adder 310 calculates the difference between the output value of the multiplier 308 and the filter coefficient C(m, 1).

Figure 7:
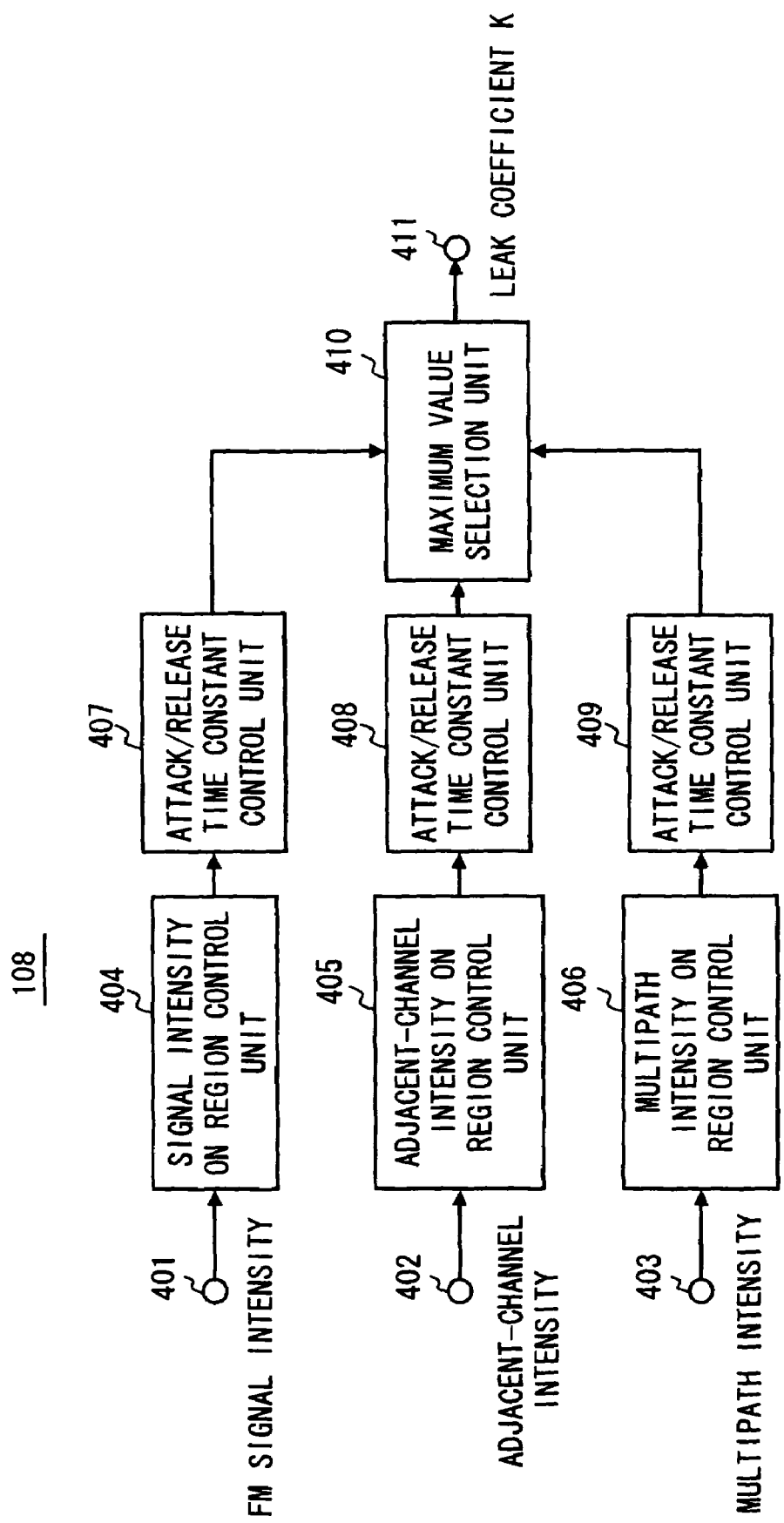
FIG. 7 is a block diagram of an equalizer control unit provided in the FM receiver according to the first exemplary embodiment of the present invention.

Next, a configuration example and the operation of the equalizer control unit 108 will be described in detail. FIG. 7 is a block diagram of the equalizer control unit 108. In FIG. 7, an FM signal intensity input 401 is supplied with a signal intensity detected by the signal intensity detecting unit 105. An adjacent-channel intensity input 402 is supplied with a signal intensity of an adjacent channel detected by the adjacent-channel detecting unit 104. Note that, as described above, the signal intensity of the adjacent channel functions as an indicator for estimating the interference amount of the adjacent channel included in the FM signal channel selected from the channel selection filter 103. A multipath intensity input 403 is supplied with a signal intensity of the multipath signal detected by the multipath detecting unit 106.

Figure 8:
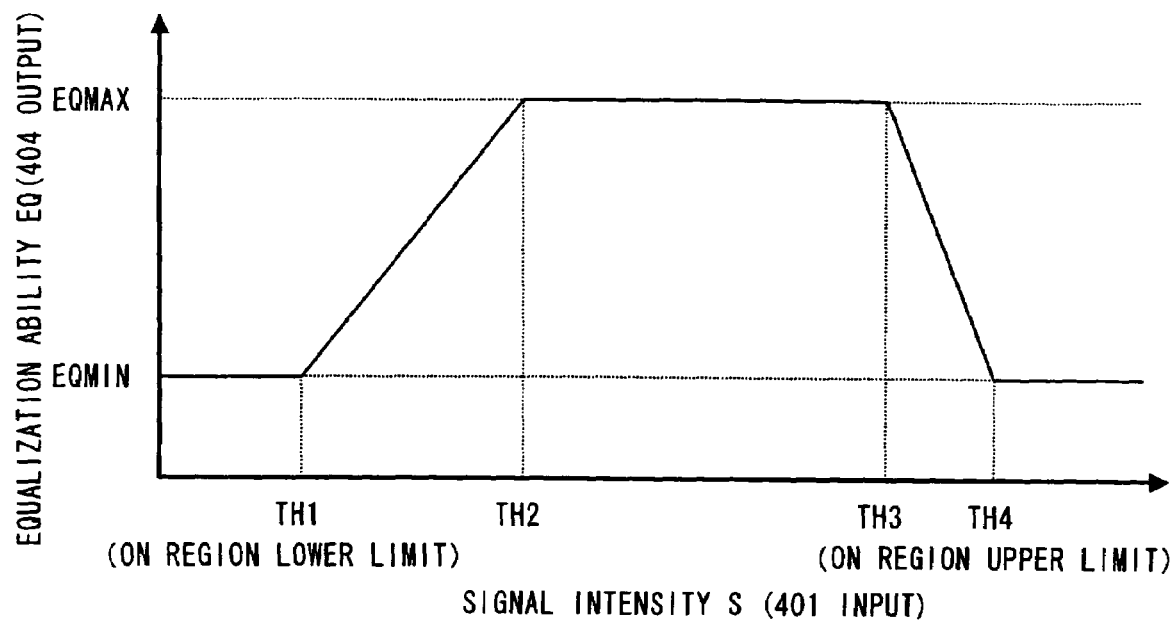
FIG. 8 is a graph showing one example of a relation between magnitude of signal intensity and equalization ability EQ.

The signal intensity ON region control unit 404 determines the equalization ability EQ of the channel equalizer 107 according to the input FM signal intensity, and outputs a control signal indicating the level of the equalization ability EQ. FIG. 8 is a graph showing one example of the relation between the magnitude of the signal intensity and the equalization ability EQ.

In case of the example in FIG. 8, when the input FM signal intensity is smaller than a threshold value TH1, the equalization ability is set to a minimum value EQMIN. Further, when the input FM signal intensity is equal to or larger than the threshold value TH1 and smaller than TH2, the equalization ability is determined to be in a range from the minimum value EQMIN to the maximum value EQMAX in order to increase the equalization ability in proportion to the magnitude of the signal intensity. When the input FM signal intensity is equal to or larger than the threshold value TH2 and is less than TH3, the equalization ability is set to the maximum value EQMAX. When the input FM signal intensity is equal to or larger than the threshold value TH3 and less than TH4, the equalization ability is determined to be in a range from the maximum value EQMAX to the minimum value EQMIN so that the equalization ability gradually decreases as the signal intensity becomes larger. Finally, the equalization ability is set to the minimum value EQMIN when the input FM signal intensity is equal to or larger than the threshold value TH4.

When S<TH1, EQ=EQMIN;
when TH1≦S<TH2, EQ=(S−TH1)*(EQMAX−EQMIN)/(TH2−TH1)+EQMIN;
when TH2≦S<TH3, EQ=EQMAX;
when TH3≦S<TH4, EQ=(S−TH3)*(EQMIN−EQMAX)/(TH4−TH3)+EQMAX; and
when TH4≦S, EQ=EQMIN. In summary, the signal intensity ON region control unit 404 is able to specify the range of executing the adaptive equalization by the channel equalizer 107 and the level of the equalization ability at this time according to the signal intensity of the input FM signal.

Note that it is merely one example to change the equalization ability in a position near the lower limit (TH1 to TH2) and a position near the upper limit (TH3 to Th4) of the signal area where the equalization ability changes to a form of a linear function with constant inclination as shown in the example in FIG. 8. For example, the change of the equalization ability in the position near the lower limit and the position near the upper limit may be approximated to a form of a higher-order function. Especially, the lower limit of the input FM signal intensity S has a detection limit. A slope that can correct a non-linear input in such a detection limit may be provided. Further, in the example shown in FIG. 8, the ON region, which is a region where the equalization ability is larger than the minimum value EQMIN, is defined as one continuous region. However, the ON region may also be divided into two or more discontinuous regions.

Figure 9:
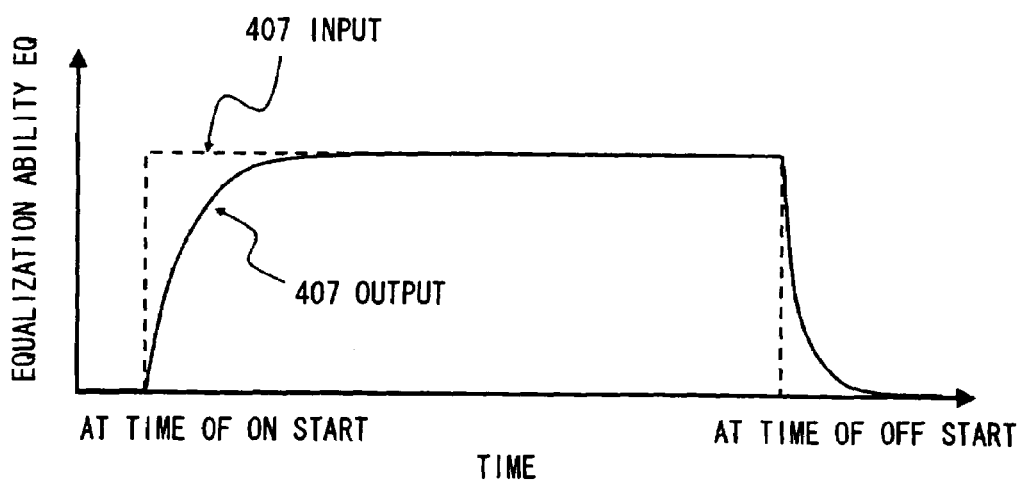
FIG. 9 is a graph showing a response waveform of an attack/release time constant control unit 407.

The equalization ability EQ output from the signal intensity ON region control unit 404 is then input to an attack/release time constant control unit 407. The unit 407 outputs a signal with response delay with respect to the change of the input equalization ability EQ. FIG. 9 shows a response waveform of the unit 407. The rectangular graph shown by dashed line in FIG. 9 shows the input signal, or one example of the equalization ability EQ supplied from the signal intensity ON region control unit 404. On the other hand, the solid line graph of FIG. 9 shows the signal output from the attack/release time constant control unit 407 in response to the input signal shown by dashed line graph.

As shown in FIG. 9, the attack/release time constant control unit 407 controls the equalization ability EQ with time constant corresponding to each of an ON direction (direction that enhances the equalization ability EQ) and an OFF direction (direction that decreases the equalization ability EQ). In this example, the time constant of the ON direction is referred to as attack time, and the time constant of the OFF direction is referred to as release time. If the attack time is shorter than the release time, the equalization ability of the channel equalizer 107 is controlled to increase. On the other hand, if the attack time is longer than the release time, the equalization ability of the channel equalizer 107 is controlled to decrease. Whether which of the attack time and the release time is set larger than the other may be determined based on the characteristics of the FM receiver 1 of whether to decrease the average equalization ability in order to put more emphasis on decreasing of the noise or to increase the average equalization ability in order to put more emphasis on sound quality of the sound signal that will be reproduced.

By providing the attack/release time constant control unit 407, it is possible to prevent the abrupt change of the equalization ability EQ following the instantaneous time variation of the input FM signal intensity. In the example of FIG. 9, the time constant control is shown as it is close to the behavior of the logarithmic function; however, this is merely an example. For example, the behavior of the response delay by the unit 407 may be collinear approximation with constant inclination.

Now, the effect of the multi-stage control of the equalization ability EQ by the signal intensity ON region control unit 404 will be described with reference to FIGS. 10A and 10B. FIG. 10A is a graph showing the relation between a noise level and a reproduction signal level reproduced by a stereo demodulation unit 110 and the input FM signal intensity supplied to the FM signal intensity input 401. The horizontal axis of FIG. 10A indicates the input FM signal intensity supplied to the FM signal intensity input 401. The longitudinal axis of FIG. 10A indicates the audio level. L1 in FIG. 10A indicates the reproduction signal level. L2 indicates the noise level at the time of stopping the adaptive equalization of the channel equalizer 107. Further, L3 to L7 indicate the noise level when the equalization ability of the adaptive equalization processing of the channel equalizer 107 is controlled in multi stages. A case of gradually increasing the equalization ability is shown by L3 to L7 in this order.

In the region of the weak electrical field where the signal intensity is weak, the FM reception noise gradually increases. However, it is possible to relatively decrease the noise level by carrying out the adaptive equalization and to increase the reception sensitivity (S/N ratio). At this time, the degree of enhancing the reception sensitivity (S/N ratio) increases as the equalization ability of the channel equalizer 107 increases. In this case, it is not necessarily true that it is preferable to stop the channel equalizer 107 in the weak electrical field region as disclosed in INOUE. It is rather preferable to attenuate the channel equalizer 107 in the weak electrical field region because the texture of the noise for the human auditory sense is improved. The FM receiver 1 is able to adjust the equalization ability of the channel equalizer 107 in order to harmonize the two elements of improving the reception sensitivity and reducing the noise that are conflict with each other. By adjusting the equalization ability, the target noise level with less discomfort for the human auditory sense can be realized.

In the region where the input FM signal intensity reaches or exceeds the certain level, it is preferable not to carry out the adaptive equalization because the noise characteristics is more enhanced than the case of carrying out the adaptive equalization. Thus, in this region, it is better to gradually decrease the equalization ability of the channel equalizer 107.

Further, even when the upper limit or the lower limit is crossed by the variations of the signal intensity, the channel equalizer may be controlled so that there is no discomfort for the human auditory sense by the time control with time constant.

The above description is about the ON region control for the input FM signal intensity, and the attack/release time constant control. Similarly, the ON region control is performed according to the independent parameter in an adjacent-channel intensity ON region control unit 405 for the adjacent-channel intensity input 402 as well. Further, the time constant control that is similar to the attack/release time constant control unit 407 can be performed in an attack/release time constant control unit 408.

Further, the ON region control that is similar to the control in the signal intensity ON region control unit 404 is performed according to the independent parameter in a multipath intensity ON region control unit 406 for the multipath intensity input 403 as well. Further, the time constant control that is similar to the control in the attack/release time constant control unit 407 is executed in an attack/release time constant control unit 409.

Note that the attack time and the release time may be common for the three types of control of the signal intensity ON region control, the adjacent-channel intensity ON region control, and the multipath intensity ON region control.

The above-described three types of control are integrated by selecting the maximum value of the outputs of the three attack/release time constant control units 407 to 409 in a maximum value selection unit 410. In the example shown in FIG. 7, the maximum value selection unit 410 outputs the leak coefficient K, which is supplied to the channel equalizer 107. In other words, the equalization ability of the channel equalizer 107 is determined depending on the control of applying the strongest equalization ability control of the three types of control. Note that the output of the maximum value selection unit 410 may be normalized as appropriate so that it is within the range of the leak coefficient K.

As already described above, as the leak coefficient K is closer to 0, the filter coefficient quickly converges to a predetermined value (0 or 1), and the equalization ability of the channel equalizer 107 decreases. On the other hand, as the leak coefficient K is closer to 1, the filter coefficient converges to the predetermined value (0 or 1) with delay to maintain the equalization processing. Accordingly, the equalization ability of the channel equalizer 107 increases.

As described above, the FM receiver 1 gradually changes the equalization ability of the channel equalizer 107 in accordance with the characteristics of the signal intensity of the input FM signal, the multipath signal intensity, and the adjacent-channel signal intensity.

Thus, the FM receiver 1 controls the equalization ability by the equalizer control unit 108 when the FM signal in which the adaptive equalization is difficult and the reception quality is deteriorated is input, so as to prevent the output of the unstable signal due to non-convergence, oscillation, and divergence of the channel equalizer 107. Further, it is possible to prevent the noise that is unnatural for the human auditory sense and generated by the unstable signal inputting to the FM detecting unit 109. Note that the FM signal in which the adaptive equalization is difficult and the reception quality is deteriorated is, for example, the FM signal including complicated multipath components, the FM signal including the time-varying multipath components, and the FM signal whose signal intensity is not stable due to the interfering signal or the noise signal mixed therein.

Further, the FM receiver 1 is able to prevent large discontinuous variations of the signal to be output compared with the receiving device that only turns on and off the adaptive equalization. Thus, the occurrence of the demodulation noise due to the abrupt change of the signals can be suppressed.

Further, according to the first exemplary embodiment, the filter coefficients of the channel equalizer 107 converges to the predetermined values and the convergence speed is adjusted by adopting the configuration as shown in FIGS. 3 to 6. It is thereby possible to easily adjust the equalization ability in the adapting processing.

Further, in the first exemplary embodiment, when the equalization ability is changed following the change of the input FM signal intensity, the adjacent-channel intensity, and the multipath intensity, the equalization ability is changed with response delay by the attack time and the release time. Accordingly, it is possible to prevent the equalization ability of the channel equalizer 107 from being abruptly changed following the instantaneous time variation of the input conditions such as the input FM signal intensity, the adjacent-channel intensity, and the multipath intensity. Accordingly, it is possible to suppress the occurrence of the demodulation noise due to the abrupt change of the signal input to the FM receiver 1.

Furthermore, in the first exemplary embodiment, the control of the equalization ability of the channel equalizer 107 is made possible by the change of the leak coefficient, the change of the step size, and the change of the number of taps. Accordingly, the calculation amount of the channel equalizer 107 required to control the equalization ability of the channel equalizer 107 does not greatly increase with respect to the control of the adapting processing. Accordingly, it is possible to minimize the size for implementation or increase of burden for the performance of the channel equalizer 107.

<Second Exemplary Embodiment>

An FM receiver according to the second exemplary embodiment is obtained by changing the configuration of the equalizer control unit 108 included in the FM receiver 1 according to the first exemplary embodiment of the present invention. Note that the configuration of the FM receiver according to the second exemplary embodiment is the same as that of the above-described FM receiver 1 shown in FIG. 1. Accordingly, the overlapping description will be omitted, and the same components as the first exemplary embodiment are denoted by the same reference numerals.

Figure 11:
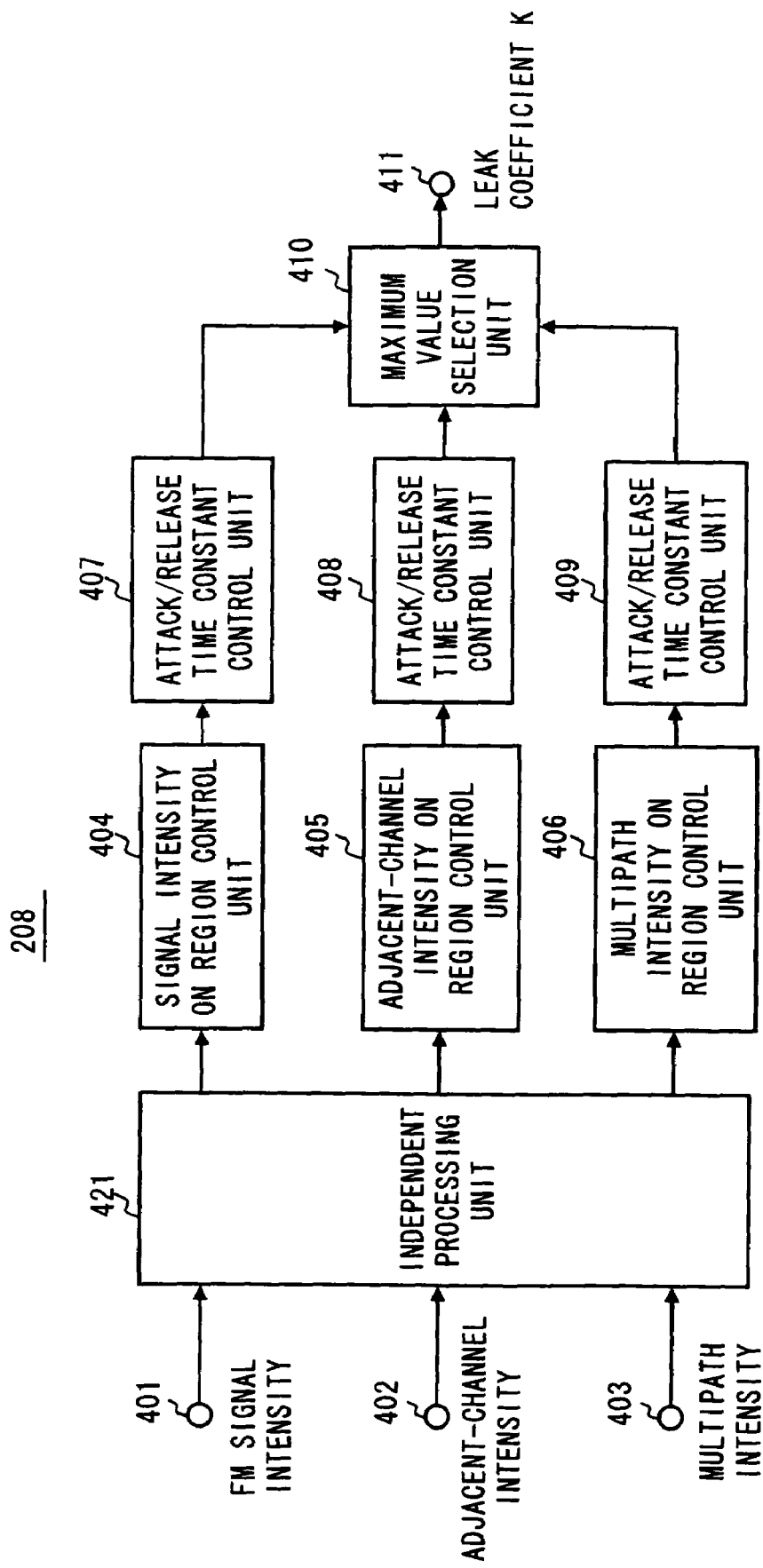
FIG. 11 is a block diagram of an equalizer control unit provided in an FM receiver according to a second exemplary embodiment of the present invention.

FIG. 11 shows the configuration of an equalizer control unit 208 which shows the difference between the second exemplary embodiment and the first exemplary embodiment. The equalizer control unit 208 is different from the above-described equalizer control unit 108 in that an independent processing unit 421 is provided. The independent processing unit 421 is provided to execute the equalization ability control in accordance with the input condition which is to be prioritized when at least two of the three input conditions (FM signal intensity input 401, adjacent-channel intensity input 402, and multipath intensity input 403) are satisfied at the same time.

The independent processing unit 421 processes the input signal in advance so that the equalization ability control is carried out in accordance with the input condition which is to be prioritized when at least two of the three input conditions are satisfied at the same time. As an example, assume a case in which the FM signal intensity input 401 is given the highest priority, the adjacent-channel intensity input 402 is given the priority next, and the multipath intensity input 403 is given the lowest priority. In this case, the independent processing unit 421 makes the adjacent-channel intensity and the multipath intensity smaller than the input value and supplies the signals to the ON region control units 405 and 406 when the magnitude of the input FM signal intensity is within a predetermined range. Further, the independent processing unit 421 makes the multipath intensity smaller than the input value and supplies the signal to the multipath intensity ON region control unit 406 when the magnitude of the adjacent-channel intensity is within the predetermined range.

One example where each input condition is satisfied at the same time is when the input FM signal intensity and the multipath intensity are deteriorated so that they are not suitable for the adaptive equalization. In this case, even when it is desired to prioritize the equalization ability control based on the input FM signal intensity, the selection result by the maximum value selection unit 410 may be the equalization ability control in accordance with the satisfaction of the condition of the multipath intensity by the satisfaction of the condition in the multipath intensity ON region control unit 406.

In order to prevent such an unintended operation, it is preferable to set the priority to make the condition having the highest priority independent so as to prevent the input conditions from being redundantly controlled. The independent processing unit 421 processes the input signals in advance based on the determination of the priority.

Now, the operation example of the independent processing unit 421 will be described in detail. When the value of the FM signal intensity input 401 is set to Sd, the value of the adjacent-channel intensity input 402 is set to Su, and the value of the multipath intensity input 403 is set to Sm, the independent processing unit 421 preferably carries out the processing of STEPs 1 to 3 below. Note that Sd, Su, Sm, Sdth, Suth, and Sudth are all shown in decibel (dB) in the explanation of STEPs 1 to 3. According to the processing, it is possible to make the input condition independent so as to prevent the control of the equalization ability with the plurality of input conditions bring redundant.

STEP 1: When Sd is Sdth or smaller and Su is Suth or smaller (where Sdth and Suth are constant numbers), the adjacent-channel intensity and the multipath intensity are attenuated or cleared to 0 in order to prioritize the control of the equalization ability based on the FM signal intensity input.

STEP 2: When the condition of STEP 1 is not satisfied and Su is Sd+Sudth or larger (where Sudth is a constant number), the input FM signal intensity and the multipath intensity are attenuated or cleared to 0 in order to prioritize the control of the equalization ability based on the adjacent-channel intensity.

STEP 3: When the conditions of STEPs 1 and 2 are not satisfied, the input FM signal intensity and the adjacent-channel intensity are attenuated or cleared to 0 in order to prioritize the control of the equalization ability based on the multipath intensity.

<Third Exemplary Embodiment>

An FM receiver according to the third exemplary embodiment is obtained by changing the configuration of the equalizer control unit 108 included in the FM receiver 1 according to the first exemplary embodiment of the present invention.

Note that the configuration of the FM receiver according to the third exemplary embodiment is the same as that of the above-described FM receiver 1 shown in FIG. 1. The overlapping description will be omitted, and the same components as the first exemplary embodiment are denoted by the same reference symbols.

Figure 12:
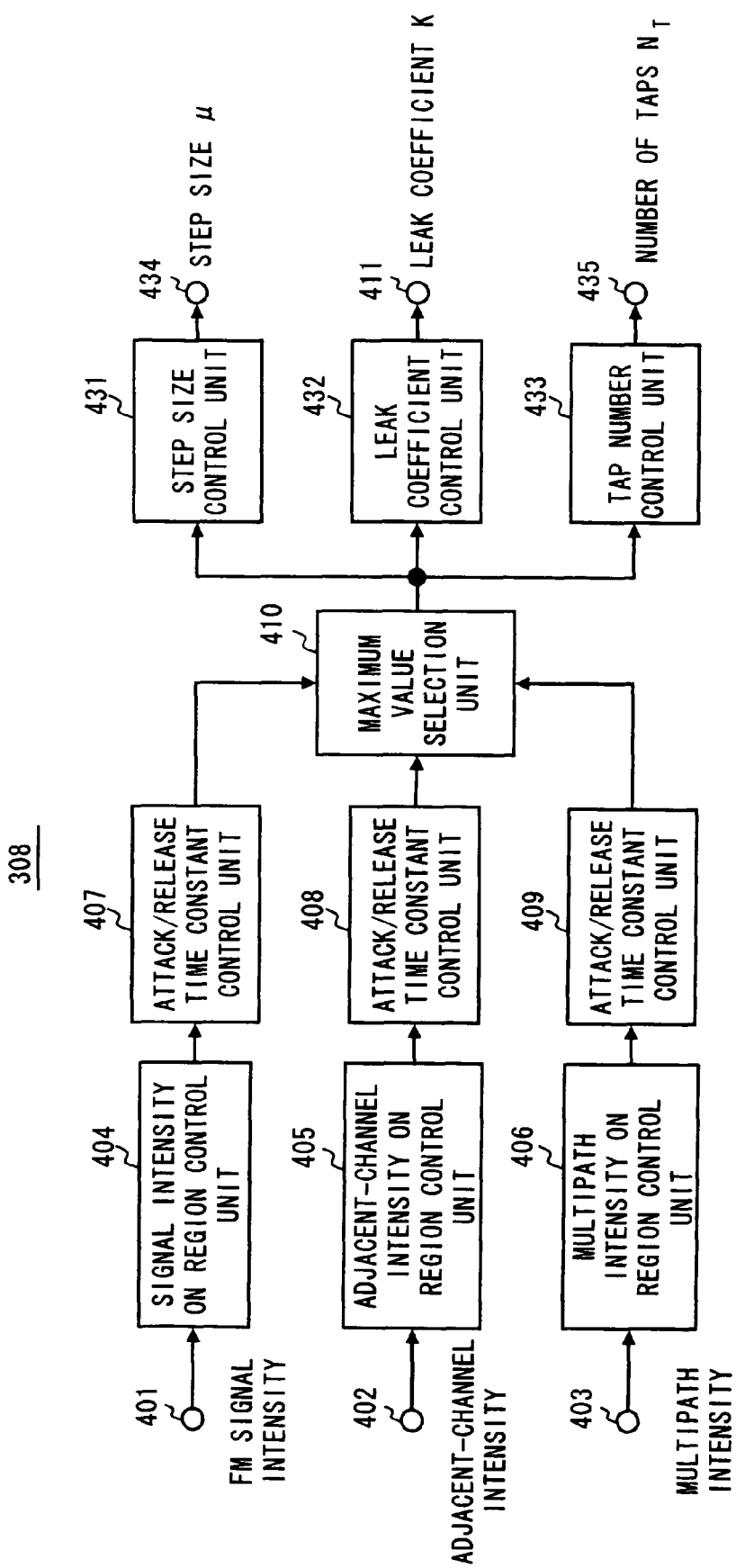
FIG. 12 is a block diagram of an equalizer control unit provided in an FM receiver according to a third exemplary embodiment of the present invention.

FIG. 12 shows the configuration of an equalizer control unit 308 which shows the difference between the third exemplary embodiment and the first exemplary embodiment. The equalizer control unit 308 is different from the above-described equalizer control unit 108 in that the equalization ability control is executed by the step size p and the number of taps $N_T$ in addition to the equalization ability control by the leak coefficient K. More specifically, the equalizer control unit 308 includes a step size control unit 431, a leak coefficient control unit 432, and a tap number control unit 433 in the downstream of the maximum value selection unit 410.

The step size μ output from the step size control unit 431 and the number of taps $N_T$ output from the tap number control unit 433 are input to the common coefficient control unit 208 of the channel equalizer 107 shown in FIG. 2, and influences the coefficient calculation in the channel equalizer 107.

For example, the common coefficient control unit 208 executes control that the filter coefficient of the specific tap always becomes 0 in accordance with the number of taps $N_T$ input from the equalizer control unit 308. Alternatively, the common coefficient control unit 208 may execute control to remove the tap excluded from the adaptive filter from the adding target with the adders 206_1 to 206_N−1 in accordance with the number of taps $N_T$.

Figure 13A:
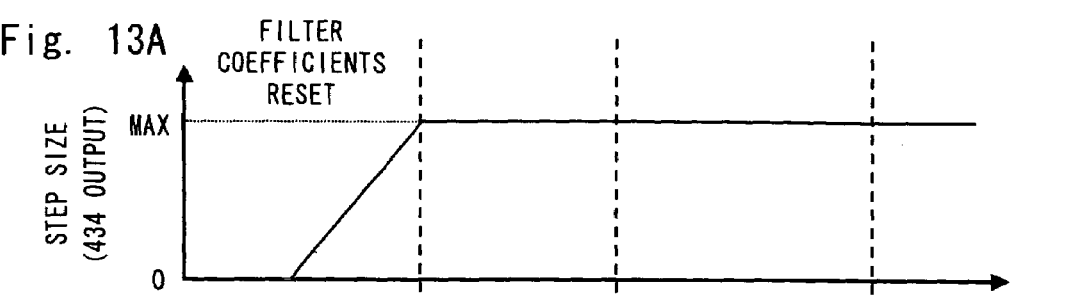
FIG. 13A is a graph showing an example of the control operation of a step size control unit 431.
Figure 13B:
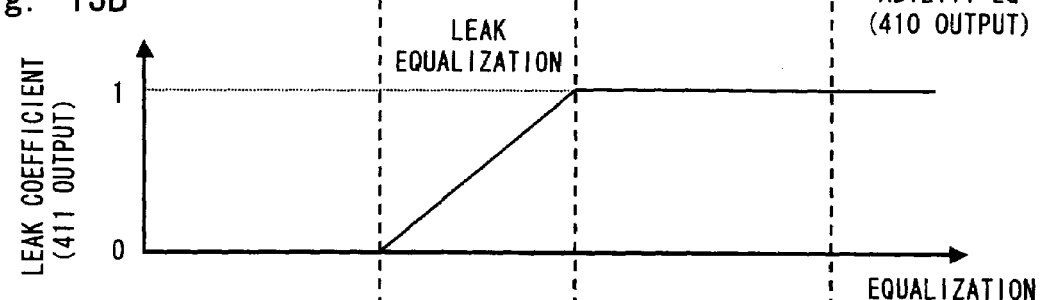
FIG. 13B is a graph showing an example of the control operation of a leak coefficient control unit 432.
Figure 13C:
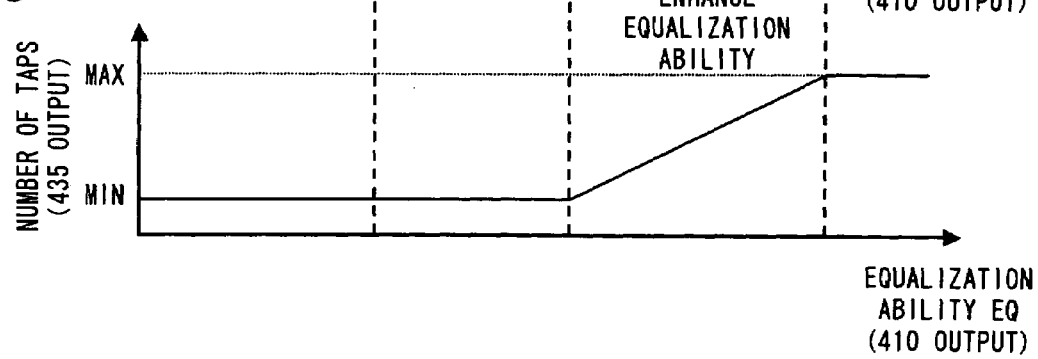
FIG. 13C is a graph showing an example of the control operation of a tap number control unit 433.

FIGS. 13A to 13C are graphs showing operation example of the step size control unit 431, the leak coefficient control unit 432, and the tap number control unit 433 in FIG. 12. The operation example of FIGS. 13A to 13B intends to use the following facts (a) to (c) for controlling the equalization ability of the channel equalizer 107: (a) as the step size u is smaller, the adapting processing that cancels the error with the reference signal does not function and the equalization ability becomes smaller; (b) as the leak coefficient K is smaller, the leak amount of the filter coefficient increases and the equalization ability becomes smaller; and (c) the equalization ability increases as the number of taps is larger.

In the example of FIGS. 13A to 13C, when the output of the maximum value selection unit 410 indicating the equalization ability EQ of the equalizer is the minimum value EQMIN, the step size μ is minimum, the leak coefficient K is minimum (leak amount is maximum), and the number of taps $N_T$ is minimum. On the other hand, when the output of the maximum value selection unit 410 is the maximum value EQMAX, the step size μ is maximum, the leak coefficient K is maximum (leak amount is minimum), and the number of taps $N_T$ is maximum. Further, in the step of gradually increasing the value of the equalization ability, the step size control, the leak coefficient control, and the tap number control are performed in this order.

According to the example of FIGS. 13A to 13C, the filter coefficients can be reset by performing the step size control. Further, the adaptive equalization can be performed while adjusting the leak amount by the leak coefficient control. Furthermore, the equalization ability can further be enhanced as the number of taps increases by the tap number control.

Controlled by the equalizer control unit 308, the channel equalizer 107 performs the operation of making the internal filter coefficients converge to the specific values, the operation of changing the magnification of the coefficient update or the step size μ, and the operation of changing the number of taps of the internal adaptive filter at the same time or independently from each other. Thus, the equalization ability in the adapting processing is gradually adjusted.

Upon completion of the convergence of the filter coefficients by the operation of making the filter coefficients converge to the specific values by the channel equalizer 107, the channel equalizer 107 gives a delay to the input FM signal and outputs the delayed FM signal without modification. In short, the channel equalizer 107 does not function as the equalizer. The equalizer control unit 308 is able to adjust the intensity of the equalization ability by changing the convergence speed (time constant) of the filter coefficients.

Further, as the step size μ becomes smaller, the change of the filter coefficients is suppressed, and the equalization processing cannot follow the change of the input FM signal. In other words, the update speed of the filter coefficients can be changed by changing the step size μ, and the intensity of the equalization ability can be adjusted.

Further, as the number of taps $N_T$ becomes smaller, the strong equalization cannot be performed as the order of the filter formed by the adaptive filter is limited. In other words, the intensity of the equalization ability can be adjusted by changing the number of taps $N_T$.

Incidentally, in the examples of FIGS. 12 and 13A to 13C, the three types of control of the equalization ability (the step size μ, the leak coefficient K, and the number of taps $N_T$) are equally performed for the three types of input conditions (the input FM signal intensity, the adjacent-channel intensity, and the multipath intensity). However, for example, the step size control and the tap number control may be effective only for the equalization ability control based on the multipath intensity. In this case, the equalization ability control of the channel equalizer 107 based on the multipath intensity is performed in the maximum range. On the other hand, the equalization ability control by the adjacent-channel intensity and the input FM signal intensity may be executed in a limited way by the leak coefficient K.

Further, when the appropriate step size μ and the leak coefficient K exist depending on the number of taps $N_T$, for example, the equalizer control unit 308 may determine the three parameters in correlation with each other and supplies determined values to the channel equalizer 107.

<Other Embodiments>

The first to third exemplary embodiments describe the FM receivers gradually adjusting the equalization ability of the adaptive equalization processing in multi stages based on at least one of the three characteristics regarding the input signal: the input FM signal intensity; the adjacent-channel intensity; and the multipath intensity. However, the above three characteristics are merely an example indicating suitability of the input signal for the adaptive equalization processing. It is also possible to adjust the equalization abilities based on other characteristics in the FM receivers according to the exemplary embodiments.

Further, the first to third exemplary embodiments describe the case in which the present invention is applied to the FM receiver. However, the present invention can be applied to devices that receive signals modulated by modulation systems where a modulation signal has constant amplitude characteristics and the CMA is effective, specifically, phase modulation (PM), and FSK (Frequency Shift Keying) and PSK (Phase Shift Keying) that are digital modulation systems.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An apparatus, comprising:
an adaptive filter that performs an adaptive equalization processing for an input signal so as to make an amplitude of an equalized output signal constant, and
a control unit that gradually changes equalization ability of the adaptive equalization processing of the adaptive filter in accordance with characteristics of the input signal,
wherein the characteristics include at least one of a signal intensity of the input signal, a signal intensity of an adjacent-channel signal included in the input signal, and a signal intensity of a multipath signal included in the input signal.

2. The apparatus according to claim 1, wherein
the characteristics indicate a degree of suitability of the input signal for the adaptive equalization processing; and
the control unit gradually decreases the equalization ability as the input signal becomes a state of not being suitable for the adaptive equalization processing.

3. The apparatus according to claim 1, wherein the control unit detects an environment involving non-convergence, oscillation, or divergence of filter coefficients of the adaptive filter in accordance with characteristics of the input signal, and decreases the equalization ability under the detected environment.

4. The apparatus according to claim 1, wherein the control unit makes filter coefficients of the adaptive filter converge to predetermined values and changes speed of convergence of the filter coefficients to the predetermined values so as to gradually decrease the equalization ability.

5. The apparatus according to claim 4, wherein the control unit cancels the convergence of the filter coefficients to the predetermined values and changes the speed of canceling the convergence from the predetermined values so as to gradually increase the equalization ability.

6. The apparatus according to claim 4, wherein the control unit makes at least one of the filter coefficients converge to a value other than 0, and the remaining filter coefficients to 0.

7. The apparatus according to claim 1, wherein
the characteristics include at least two signal characteristics, and
the control unit preferentially carries out control of the equalization ability based on one of the two signal characteristics than control of the equalization ability based on the other of the two signal characteristics.

8. The apparatus according to claim 1, wherein the control unit increases or decreases the equalization ability with response delay in changing the equalization ability in response to change of the characteristics.

9. The apparatus according to claim 8, wherein a time constant of the response delay in increasing the equalization ability is different from a time constant of the response delay in decreasing the equalization ability.

10. The apparatus according to claim 1, wherein the control unit controls the equalization ability in stages by increasing or decreasing a step size of the adaptive filter.

11. The apparatus according to claim 1, wherein the control unit controls the equalization ability in stages by increasing or decreasing a number of taps of the adaptive filter.

12. The apparatus according to claim 4, wherein the control unit makes the filter coefficients of the adaptive filter converge to the predetermined values such that the adaptive filter outputs a delayed input signal without the adaptive equalization processing.

13. A method, comprising:
detecting characteristics of an input signal;
performing an adaptive equalization processing for the input signal by an adaptive equalization filter so as to make an amplitude of an equalized output signal constant; and
gradually changing equalization ability of the adaptive equalization processing of the adaptive filter in multi stages in accordance with the characteristics of the input signal,
wherein the characteristics include at least one of a signal intensity of the input signal, a signal intensity of an adjacent-channel signal included in the input signal, and a signal intensity of a multipath signal included in the input signal.

14. The method according to claim 13, wherein
the characteristics indicate a degree of suitability of the input signal for the adaptive equalization processing; and
the controlling of the equalization ability in multi stages includes decreasing the equalization ability as the input signal becomes a state of not being suitable for the adaptive equalization processing.

15. The method according to claim 13, wherein the gradually changing of the equalization ability includes detecting an environment involving non-convergence, oscillation, or divergence of filter coefficients of the adaptive filter in accordance with characteristics of the input signal, and decreasing the equalization ability under the detected environment.

16. The method according to claim 13, wherein the controlling of the equalization ability in multi stages includes making filter coefficients of the adaptive filter converge to predetermined values and changing speed of convergence of the filter coefficients to the predetermined values so as to gradually decrease the equalization ability.

17. The method according to claim 13, wherein the controlling of the equalization ability in multi stages includes cancelling the convergence of the filter coefficients to the predetermined values and changing the speed of canceling the convergence from the predetermined values so as to gradually increase the equalization ability.

18. The method according to claim 13, wherein the gradually changing of the equalization ability includes increasing or decreasing the equalization ability with response delay in changing the equalization ability in response to change of the characteristics.

19. The method according to claim 18, wherein a time constant of the response delay in increasing the equalization ability is different from a time constant of the response delay in decreasing the equalization ability.

20. An apparatus, comprising:
an adaptive filter that performs, based on filter coefficients such as one of a plurality of the filter coefficients including first, second and third filter coefficients, an adaptive equalization processing for an input signal, to generate an output signal of which amplitude is equalized, and that updates the first filter coefficients after generating a first output signal based on the first filter coefficients; and a control unit that generates a control signal to change equalization ability of the adaptive equalization processing of the adaptive filter in accordance with characteristics of the input signal, wherein the second filter coefficients is between the first filter coefficients and the third filter coefficients, wherein the adaptive filter updates the first filter coefficients to the second filter coefficients in response to the control signal indicating a decreasing of the equalization ability, wherein the adaptive filter updates the second filter coefficients to third filter coefficients after generating an second output signal based on the second filter coefficients, and wherein a third output signal is generated based on the third filter coefficients away from the performing of the adaptive equalization processing.

21. The apparatus according to claim 20,
wherein the adaptive filter performs the adaptive equalization processing for the input signal when the first filter coefficients or the second filter coefficients are set as the filter coefficients, and wherein the adaptive filter generates a delayed input signal as the third output signal when the third filter coefficients are set as the filter coefficients.

22. The apparatus according to claim 20,
wherein the adaptive filter updates, when the control signal indicates a first value, the first filter coefficients after generating the first output signal to generate a equalized first output signal with constant amplitude characteristics, and wherein the adaptive filter updates, when the control signal indicates a second value, the first filter coefficients to the second filter coefficients and the third filter coefficients in order to generate a delayed input signal as the third output signal when the third filter coefficients are set as the filter coefficients.

23. The apparatus according to claim 22,
wherein the adaptive filter updates the first filter coefficients based on the first output signal when the control signal indicates the first value, and wherein the adaptive filter does not update the first filter coefficients based on the first output signal when the control signal indicates the second value.

24. The apparatus according to claim 20,
wherein the input signal is a signal modulated through a modulation technique selected from the group consisting of Frequency Modulation(FM), Phase Modulation (PM), Frequency Shift Keying(FSK) and Phase Shift Keying(PSK), wherein the apparatus further comprises a demodulation unit that demodulates the modulated input signal received through the adaptive filter to generate a sound signal, and wherein the control unit gradually changes the equalization ability while the sound signal is generated.

25. The apparatus according to claim 20,
wherein the control unit comprises:
 a detector that determines the equalization ability and whether to change gradually the equalization ability, in accordance with the characteristics of the input signal; and
 a selector that sets the leak coefficient K corresponded to a result of the determining by the detector, wherein the adaptive filter comprises:
 an operation unit that generates, based on the input signal and the filter coefficients, the output signal; and
 a calculation unit that updates the filter coefficients based on the output signal and the leak coefficient K,
wherein the selector sets the coefficient K to a first value when the detector determines to perform the adaptive equalization processing with maxim equalization ability, and wherein the selector sets the coefficient K wherein K is larger than a second value and smaller than the first value when the detector determines to change gradually the equalization ability.

26. The apparatus according to claim 20, wherein the characteristics include at least one of a signal intensity of the input signal, a signal intensity of an adjacent-channel signal included in the input signal, and a signal intensity of a multipath signal included in the input signal.

* * * * *